(12) United States Patent
Kuntz

(10) Patent No.: US 8,912,699 B2
(45) Date of Patent: Dec. 16, 2014

(54) DC FIELD GRADIENT MOTOR

(71) Applicant: Dennis R. Kuntz, West Quincy & Taylor, MO (US)

(72) Inventor: Dennis R. Kuntz, West Quincy & Taylor, MO (US)

(*) Notice: Subject to any disclaimer, the term of this patent is extended or adjusted under 35 U.S.C. 154(b) by 261 days.

(21) Appl. No.: 13/628,036

(22) Filed: Sep. 26, 2012

(65) Prior Publication Data

US 2013/0257213 A1   Oct. 3, 2013

Related U.S. Application Data

(60) Provisional application No. 61/538,968, filed on Sep. 26, 2011.

(51) Int. Cl.
*H02K 21/12*   (2006.01)
*H02K 53/00*   (2006.01)
*H02K 16/04*   (2006.01)

(52) U.S. Cl.
CPC ............. *H02K 16/04* (2013.01); *H02K 53/00* (2013.01)
USPC ........... 310/156.35; 310/156.41; 310/216.006

(58) Field of Classification Search
USPC ......... 310/156.35–156.46, 216.001, 216.006, 310/216.021–216.023, 254.1
See application file for complete search history.

(56) References Cited

U.S. PATENT DOCUMENTS

| 6,700,272 | B1* | 3/2004 | Lindner | 310/166 |
| 6,949,855 | B2* | 9/2005 | Dubois et al. | 310/152 |
| 2005/0040720 | A1* | 2/2005 | Dubois et al. | 310/156.02 |
| 2006/0091755 | A1* | 5/2006 | Carlisle | 310/168 |
| 2007/0120426 | A1* | 5/2007 | Oiwa et al. | 310/49 R |
| 2007/0176505 | A1* | 8/2007 | Trzynadlowski et al. | 310/114 |
| 2008/0018194 | A1* | 1/2008 | Kakugawa et al. | 310/257 |

* cited by examiner

*Primary Examiner* — Thanh Lam
(74) *Attorney, Agent, or Firm* — O'Connell Law Firm; Thomas P. O'Connell

(57) ABSTRACT

A field gradient motor with a stator housing and first and second stator disks fixed to the stator housing for turning B-field flux lines 90 degrees toward a motor air gap of the field gradient motor. A shaft is rotatably retained by the housing, and a rotor has a hole and keyway for producing a nonferrous hole through the shaft. A plurality of tangentially magnetized triangular magnets are fixed to the rotor. In operation, the stator housing, the stator disks, the rotor, the permanent magnets, and the shaft cooperate with the coil produce an electromagnetic action of the motor. The stator housing can be an iron ring, and the first and second stator disks and the rotor can be steel.

18 Claims, 3 Drawing Sheets

DC FIELD GRADIENT MOTOR

RELATED APPLICATIONS

The present application claims the priority to Provisional Patent Application No. 61/538,968, filed Sep. 26, 2011, the complete disclosure of which being hereby incorporated herein by reference.

FIELD OF THE INVENTION

The present invention relates to electric motors. More particularly, disclosed and protected herein is a field gradient motor with a toroidal flux path shape.

BACKGROUND OF THE INVENTION

Magnetic motors with angled surfaces on magnets in the air gap have been patented by, among others, Howard Johnson with U.S. Pat. Nos. 4,151,431 and 4,877,983, Kohei Minato with U.S. Pat. Nos. 4,751,486 and 5,594,289, and Mike Brady with patent publication number WO2006045333A1. The motor of the present patent application represents an improvement over these and similar prior art disclosures by introducing a stator solenoid coil to replace the tilted field shaping magnets of the stator and closing the magnetic field path through the rotor core. The stator annular solenoid winding now permits the all-important torque and speed control to match the shaft load requirements.

SUMMARY OF THE INVENTION

In one presently contemplated embodiment, the field gradient motor is founded on a direct current motor with an iron stator that has an axial magnetic field path from end to end and allows the return of the field inside through an iron rotor. The two ends of the stator are iron disks that allow the magnetic field to become radial at the surfaces of each of two cylindrical motor air gaps. The ends of the rotor also comprise discs that allow the magnetic field to be radial at the two motor air gaps. The cylindrical iron rotor then returns the magnetic field from one air gap of a stator ring, along its core axis, to the other air gap of the next stator ring, to close the magnetic field path of the motor upon itself. The central rotor diameter is thus smaller than its gap diameter.

The dimensional design objective is to keep the local cross sections of the magnetic field flux path about the same thereby to keep the field strength constant along its path. The length of each air gap is then one quarter of the central rotor diameter. The open axial space between the pair of end discs and the radial space between the inner diameter of the stator and the center rotor diameter has the shape of a ring. It is used to house the DC solenoid winding, which can create a constant single toroidal magnetic flux field of the motor. The radial B-field direction in one motor air gap is thus reversed in the opposite air gap. The solenoid direct current is constant during constant load torque operation at the motor shaft. Variable speed control and variable torque operation are obtained with feedback control of the electrical driver for the solenoid coil winding with a speed sensor comparator.

The DC motor as described above needs design features at the gap surfaces that produce the tangential force required for motor action. Therefore, the cylindrical surfaces of the rotor disks carry ridges at the gaps that are aligned in the axial direction and that have a saw tooth cross-section around the disk perimeter. The optimum condition for operation is approached when the B-fields in the saw teeth are tangential and thus about perpendicular to the motor toroidal field that crosses the gap. This can be best achieved with strong magnetically polarized permanent magnets, such as those made of NdFeBo compounds. The resulting B-field gradients in the gap are responsible for multi-directional vector forces with tangential force components, which create the integral rotor torque. Herein, these motors are referred to as Field Gradient Motors.

As disclosed herein, field gradient motors produce an axially symmetric three-dimensional magnetic flux loop of a single toroidal shape that is co-linear with the axis of rotation of the motor and passes through the cylindrical stator backwards to close the flux loop. The B-field flux loop has no harmonically or otherwise time-varying magnetic field reversals, although it is recognized that small superposed local field ripples on top of the nominally constant flux in the iron exist. More flux loops can be added in the axial direction, and more flux loops can be stacked in the radial direction.

Both mutually opposite field polarity B-fields in the stator-rotor air gap ring pairs can be attractive. Both mutually opposite field polarity B-fields in the stator-rotor air gap ring pairs can be repulsive. Continuous circumferential magnetic pole or poles as above can have magnetic flux that traverses laminated ferromagnetic materials, and that flux can be induced only by coil windings or maintained only by permanent magnets and can be variably speed and torque controlled.

The field gradient motor can be employed to generate mechanical power and can be employed in generating motional energy modes, whether stationary or portable and mobile. The motor can form a component of a motor-generator combination. Still further, an additional coil or coils can be employed for windings as in a step transformer.

Linear or rotational shaft power can be output where magnetic north and south pull or push together or in unison push-push and pull-pull in gap pairs with the field gradient between the poles having a force vector component tangential to the pole surface.

The magnetic flux path can be split using two separate rotors. More than one winding can be used on the stator to distribute the generation of the axial magnetic field around 360 degrees of the stator or less than 360 degrees.

It is possible still further to apply the field gradient motor to nanotechnology where the rotor and stator could be one or more atoms in width. The field gradient motor can permit use of focused gradient energy, and the magnetic or motive force can be used for a battery bank to store power and to make power, heat, or torque. Any form of motor bearings or magnetic bearings can be exploited, and any form of electrostatic field gradients and magnetic field gradients can be combined for an electromotive force.

One, two, or more complete 360-degree circumferential rotor and stator single pole air gaps can be used with magnets for torque or without magnets for field crossing only. Still further, two rotor and stator single pole gaps with less than 360 degrees of single pole arcs can be employed for control of RPM in an AC motor.

The invention can be carried forth in motors not requiring a commutator and in a servomotor, pancake motor, tube motor, regular motor, actuator, linear motor, inside-out motor, ring motor to drive fluids, bearing motor, stepper motor, nanotechnology motor, and other types of motor. The field gradient motor can also be operated with pulse width modulated DC and diode or SCR rectified AC. The field gradient motor can also alternatively be designed with permanent magnets in the rotor core and in the stator to create a variety of enhancements.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

Embodiments of the field gradient motor are illustrated by way of example and not limitation in the following figures.

DETAILED DESCRIPTION OF PREFERRED EMBODIMENTS

Figure 2:
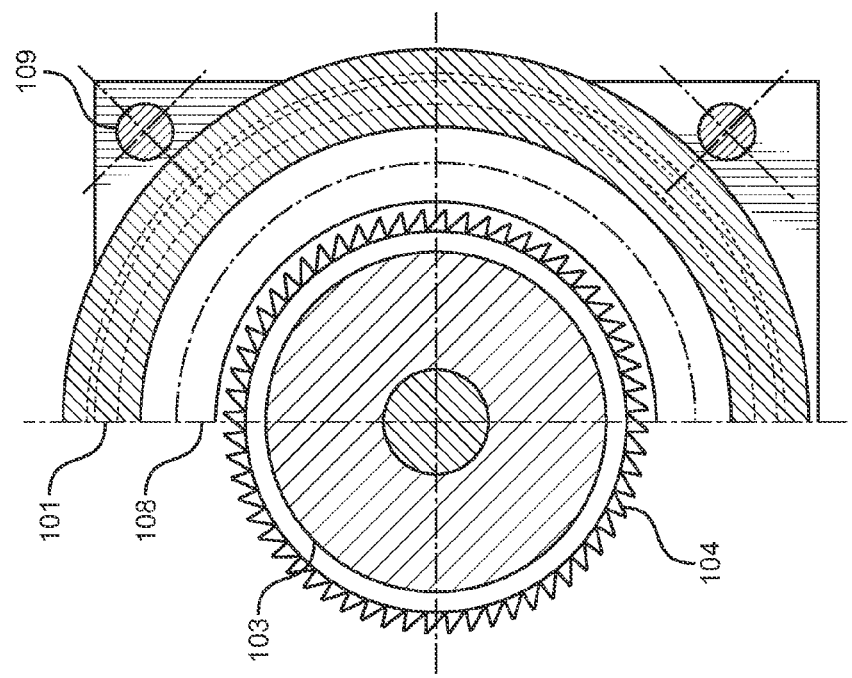
FIG. 2 is a cross section of the field gradient motor taken along the line A-A in FIG. 1 to provide a mid-plane cross-sectional view.

The field gradient motor disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

The embodiment detailed here is a direct current (DC) electric motor that does not use pole polarity switching commutators or brushless alternating pulse width modulated power electronics of known prior art DC motors. In the field gradient motor, DC current is applied to the stator solenoid to set up a single, axially symmetric closed loop flux path through the stator and that returns through the rotor. The flux path shape is thus toroidal. The flux path shape has ideally constant area cross-sections perpendicular to the B-field flux lines to minimize local B-field field strength variations in the iron path.

Local B-field variations in the air gaps however are needed to obtain motor shaft torque. None of the cylindrical stator and rotor gap magnetic material surfaces are divided into magnetic poles of alternating North and South magnetic field polarity in the 360 degree circumferential direction, but are typically a continuous single pole ring surface spanning 360 degrees. Pole polarity only differs between complete motor air gaps at adjacent gap locations at the end disks for stator and rotor. An S-stator pole facing a N-rotor pole at one of the gaps thus is of the opposite polarity of its other N-stator/S-rotor gap. The cylindrical gap surfaces of the stator disks are smooth and may have a radially magnetized permanent magnet with a radial thickness into the stator that is sufficient to prevent magnetic clutch type brake action. If not implemented, the field gradients of the rotor saw teeth can induce locking B-field variations in the stator iron that reduce torque creation.

Principle of operation. Volumetric Energy Density, energy per unit volume, is dimensionally equivalent to Pressure. This follows from considering the dimensions of energy density as determined by "length×force/volume units". By dividing numerator and denominator by unit length, this is simplified to "force/area" and can be quantified as psi, millibar, pascal, kg/square cm, and other energy density dimensions. The energy density of a fluid medium is hereby shown to be the same as the pressure of the fluid medium. This applies to all energy fields, such as the energy density of the cosmos expressed as Einstein's Cosmological Constant and gravitational, electrostatic, and magnetic fields.

When the magnetic field energy locally diverges or converges, and thereby changes, there are energy density changes that are then pressure differentials or gradient vectors acting on an area perpendicular to the vector direction. The product of this actually becomes the operational force since ("force/area")×"area"="force" associated with the local "field gradient".

Figure 3:
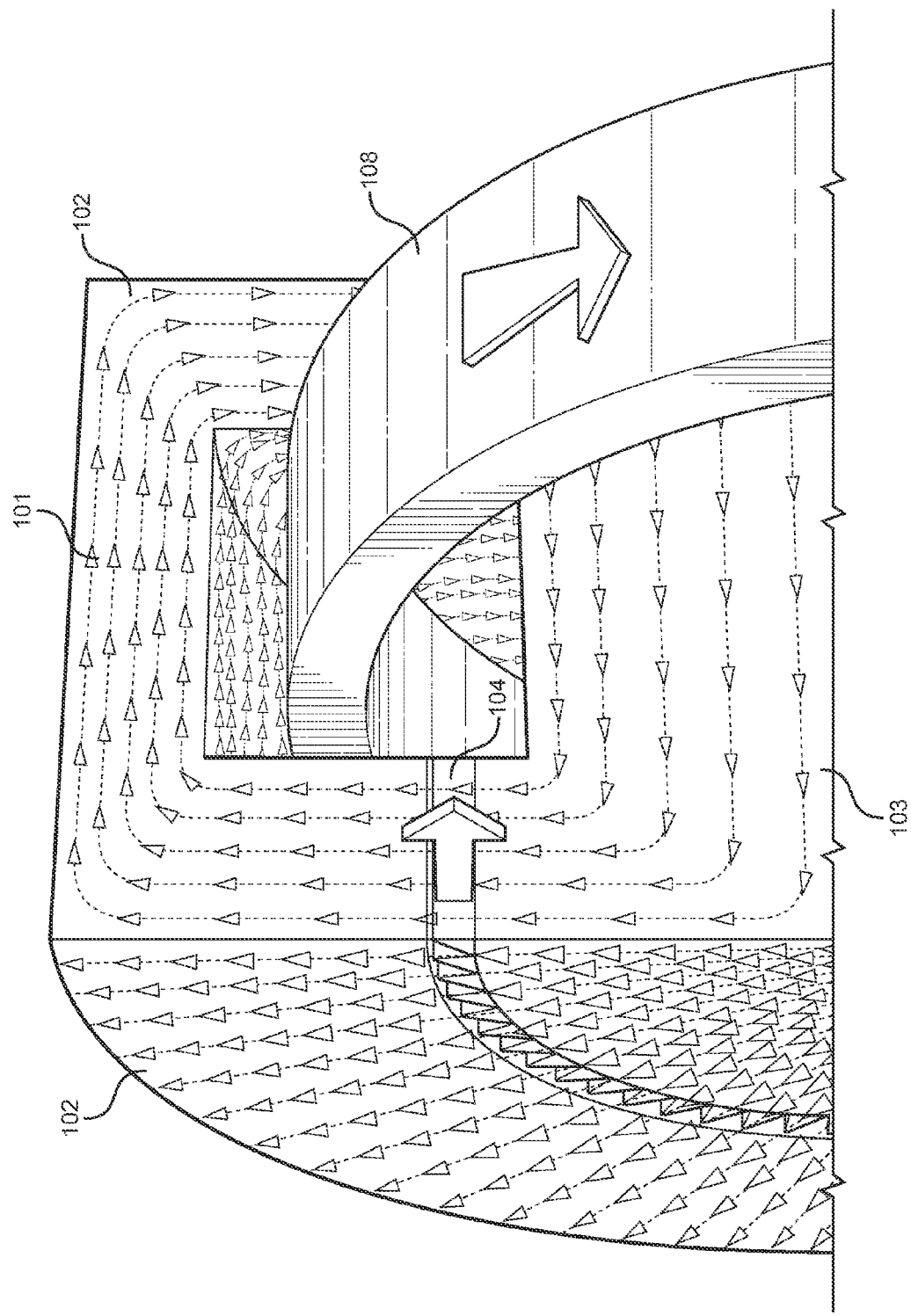
FIG. 3 is a schematic depiction of the axial magnetic field of the field gradient motor with velocity and force vectors.
Figure 4:
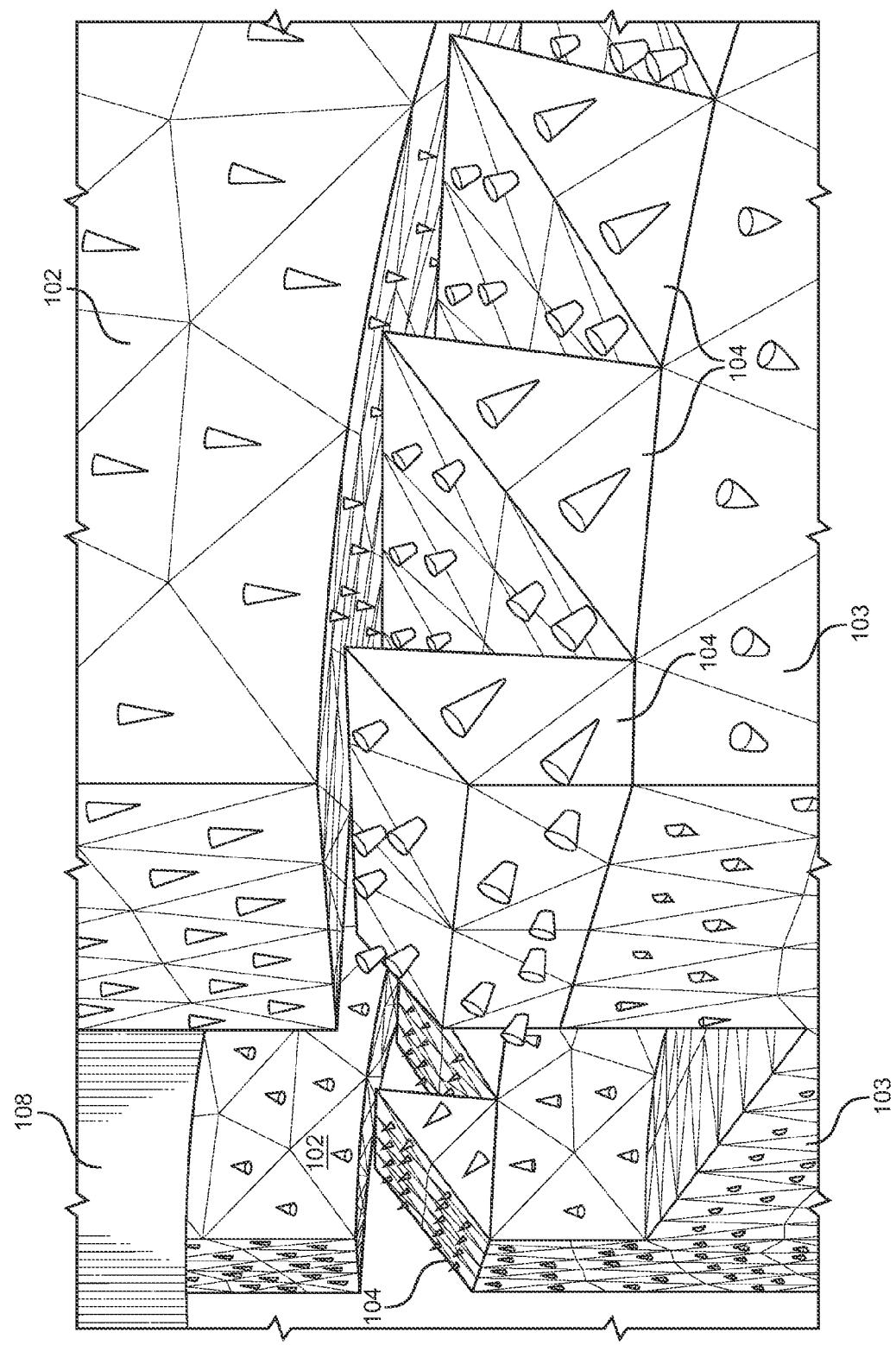
FIG. 4 is a magnified view of the permanent magnets with toroidal B-field vector arrows, coil current vectors, and force/velocity vectors schematically depicted.

The disclosed motor, therefore, generates forces by creating field gradients in the magnetic field in the air gap between the stator and the rotor of the motor and extending for a short distance beyond the gap surfaces of the stator and the rotor into the magnetic materials. The use of saw tooth shapes, as on a radial saw blade, for the motor's rotor end discs cross-section profile shapes the field gradients in such a way that the resulting forces between the rotor and the stator have meaningful vector components tangent at the rotor surface. The shapes and the resulting vector components are thus responsible for torque that rotates the rotor to produce power with the coil applied magnetic field. FIG. 3 provides a schematic depiction of the axial magnetic field achieved by the field gradient motor 100 with velocity and force vectors as illustrated, and FIG. 4 is a magnified view of the permanent magnets 104 with toroidal B-field vector arrows, coil current vectors, and force/velocity vectors schematically depicted.

The energy density in air of a nearly saturated iron magnetic flux path of 15,000 Gauss (1.5 Tesla) is about 130 psi. Since the tangent vector is a fraction of the gap vector, it is projected that here a constant 5 psi tangent field gradient as a differential energy density change can be achieved. Design optimization attempts to approach this goal and maximize the derived tangent force vector of this field gradient, which is expected to be substantially larger than the typical root mean square (RMS) value of 1.7 psi for industrial 60 Hertz 3-phase induction motors. The peak value for 1.7 psi RMS is 1.7× (square root of 2)=2.4 psi.

Figure 1:
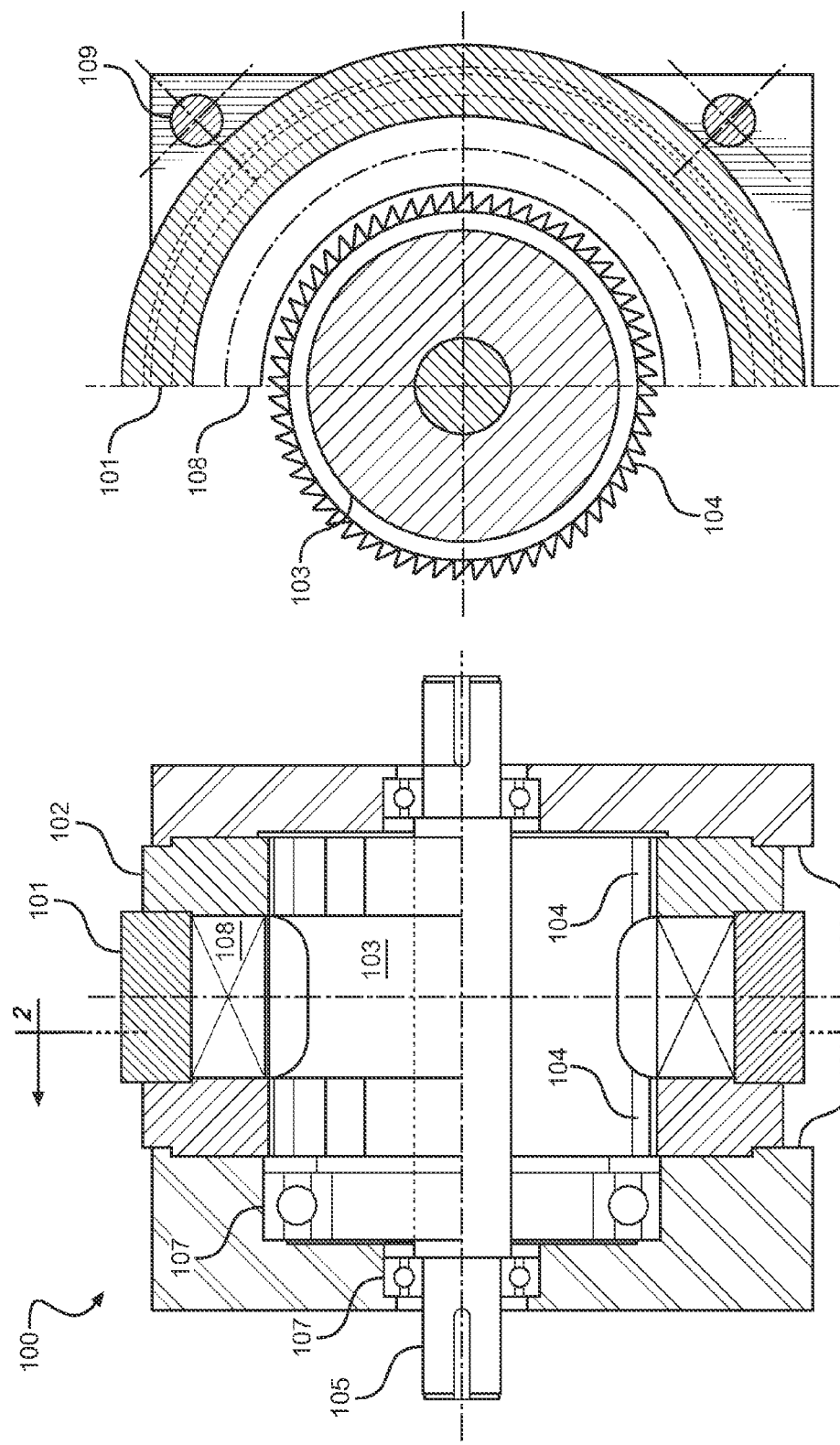
FIG. 1 is an axial cross section of a field gradient motor as disclosed herein.

Referring to FIG. 1, a Field Gradient Motor Assembly is indicated generally at 100 and has a stator housing 101, an iron ring of 1010 or 1018 steel with sufficient radial thickness to pass the axial magnetic field flux at below saturation level, such as not to exceed 1.5 Tesla. The two stator disks 102 are also 1010 or 1018 steel or equivalent and serve to turn the B-field flux lines 90 degrees towards the motor air gap. A rotor 103 is also of 1010 or 1018 steel and has a hole and keyway feature to introduce a nonferrous hole and keyway through shaft 105. The rotor ends are of larger diameter than the rotor core and less than the air gap diameter to leave space for the permanent magnets 104 on the rotor 103. Nonferrous end bells 106, bearings 107, and tie rods 109 serve to mount the stator housing 101 and stator disks 102 on a motor load base and extract rotary power from the Field Gradient Motor 100.

The cylindrical rotor gap ends have an axial length that is designed to give the radially turned B-field a strength of 1.5 Tesla. The permanent magnets 104 on the rotor 103 placed around the two rotor ends can be 45 degree equilateral triangles in cross section. The permanent magnets 104 are bonded with a short side to the cylindrical rotor ends and their long side in the axial direction. The magnets 104 are all tangentially magnetized clockwise in one of the gaps and counter-clockwise in the next gap. The stator housing 101, the stator disks 102, the rotor 103, the permanent magnets 104, and the shaft 105 cooperate with a coil 108 produce the electromagnetic action of the motor. As noted previously, a schematic depiction of the axial magnetic field achieved by the field gradient motor 100 with velocity and force vectors is illustrated in FIG. 3, and the permanent magnets 104 with toroidal B-field vector arrows, coil current vectors, and force/velocity vectors are schematically depicted in FIG. 4.

A field gradient motor 100 is preferably put into operation by applying DC from any DC source, including PWM DC, to the single solenoid 108 in the stator housing and disks 101 and 102. The operational speed of the rotor 103 is determined by the stator input current and the torque/speed curve of the load that is coupled to its output shaft 105. A higher torque at the same or higher speed can be supplied by the field gradient motor 100 by increasing the input current. A variable load torque at the same speed can be handled by the electric power driver of the motor 100 with a matched servo-feedback control loop using a motor speed sensor comparitor.

The field gradient motor 100 can also be operated with high frequency pulse width modulated (PWM) DC, and diode or SCR rectified AC. Reversal of the DC current in the stator housing and disks 101 and 102 is not recommended because of potential damage to the stator permanent magnets 104 at the gap, but it is still possible to a limited degree. The torque capacity after limited reversing of the solenoid drive current and the following retarded reversal of the rotor speed is expected to be lower as a result of lesser torque at the same stator current.

This field gradient motor 100 has the advantage, that, without the magnetic field switching of the magnetic poles of conventional DC motors, the losses of eddy currents, magnetic hysteresis, and counter EMF are reduced. Therefore, energy savings with the use of field gradient motors 100 are guaranteed.

With certain details and embodiments of the field gradient motor 100 according to the present invention disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. A field gradient motor comprising:
    a stator housing;
    a motor air gap in the field gradient motor;
    first and second stator disks fixed to the stator housing comprising means for turning B-field flux lines toward the motor air gap;
    a shaft rotatably retained by the housing;
    a rotor retained relative to the shaft;
    a plurality of permanent magnets fixed to the rotor;
    a coil;
    wherein the stator housing, the stator disks, the rotor, the permanent magnets, and the shaft cooperate with the coil produce an electromagnetic action of the motor.

2. The field gradient motor of claim 1 further comprising nonferrous end bells and tie rods for mounting the stator housing and stator disks.

3. The field gradient motor of claim 1 wherein the permanent magnets are tooth-shaped.

4. The field gradient motor of claim 1 wherein the permanent magnets on the rotor have triangular cross sections.

5. The field gradient motor of claim 4 wherein the permanent magnets disposed on the rotor have 45 degree equilateral triangles cross sections.

6. The field gradient motor of claim 5 wherein the permanent magnets are retained with long sides in an axial direction.

7. The field gradient motor of claim 1 wherein the magnets are tangentially magnetized.

8. The field gradient motor of claim 7 wherein the magnets are tangentially magnetized clockwise in a first gap and counter-clockwise in a succeeding gap.

9. The field gradient motor of claim 1 wherein the rotor has gap ends with an axial length sufficient to give the radially turned B-field a strength of 1.5 Tesla.

10. The field gradient motor of claim 1 wherein the field gradient motor has an air gap diameter and wherein the rotor has ends and a rotor core wherein the ends of the rotor are of a larger diameter than the rotor core.

11. The field gradient motor of claim 10 wherein the ends of the rotor are of a diameter less than the air gap diameter thereby leaving space for the permanent magnets on the rotor.

12. The field gradient motor of claim 1 wherein the stator housing comprises an iron ring.

13. The field gradient motor of claim 12 wherein the stator housing has sufficient radial thickness to pass an axial magnetic field flux at below saturation level.

14. The field gradient motor of claim 13 wherein the motor has an axial magnetic field flux not exceeding approximately 1.5 Tesla.

15. The field gradient motor of claim 1 wherein the first and second stator disks and the rotor are steel.

16. The field gradient motor of claim 1 further comprising means for producing a nonferrous hole through the shaft.

17. The field gradient motor of claim 16 wherein the means for producing a nonferrous hole through the shaft comprises a keyway feature in the rotor.

18. The field gradient motor of claim 17 wherein the first and second stator disks turn the B-field flux lines 90 degrees towards the motor air gap of the field gradient motor.

* * * * *